United States Patent [19]

Kirk

[11] Patent Number: 5,471,566
[45] Date of Patent: Nov. 28, 1995

[54] METHODS AND APPARATUS FOR GENERATING GRAPHICS PATTERNS USING PIXEL VALUES FROM A HIGH RESOLUTION PATTERN

[75] Inventor: Richard A. Kirk, Herts, United Kingdom

[73] Assignee: Crosfield Electronics Limited, Hertfordshire, United Kingdom

[21] Appl. No.: 106,568

[22] Filed: Aug. 16, 1993

[30] Foreign Application Priority Data

Aug. 14, 1992 [GB] United Kingdom .................... 9217361

[51] Int. Cl.[6] ...................................... G06F 15/62
[52] U.S. Cl. .......................... 395/131; 395/126; 395/128
[58] Field of Search ................................... 395/119, 120, 395/125–132, 133, 139, 141, 150, 151, 155, 161; 358/448

[56] References Cited

U.S. PATENT DOCUMENTS

| | | | |
|---|---|---|---|
| 4,525,858 | 6/1985 | Cline et al. | 382/1 |
| 4,906,983 | 3/1990 | Parker | 345/189 |
| 4,954,912 | 9/1990 | MacDonald et al. | 358/448 |
| 5,239,596 | 8/1993 | Mahoney | 382/34 |
| 5,280,547 | 1/1994 | Mahoney | 382/49 |

Primary Examiner—Almis Jankus
Attorney, Agent, or Firm—Sughrue, Mion, Zinn, Macpeak & Seas

[57] ABSTRACT

A method of generating a graphics pattern comprising digital data defining the color content of pixels of the pattern within a pattern area at a first, high resolution, comprises defining (step 21) the color content of "seed" pixels at selected positions within the pattern area which are to influence the resultant pattern. The remaining pixels at the first high resolution are considered as having undefined color content. Successively lower spatial resolution versions of the pattern area are generated in accordance with a predetermined algorithm which, when sufficient defined pixels exist in the next higher resolution version neighboring an undefined pixel, interpolates color data for the corresponding lower resolution pixel, until all pixels of a lower resolution version contain defined data (step 25). A version of the pattern area is generated at the first high resolution and the content of at least the previously undefined first high resolution pixels is obtained from the lower resolution versions of the pattern area.

8 Claims, 4 Drawing Sheets

Fig. 8.

| | | | | | | | | | | | | | | |
|---|---|---|---|---|---|---|---|---|---|---|---|---|---|---|
| ? | ? | ? | ? | ? | ? | ? | ? | ? | ? | ? | ? | ? | ? | ? |
| ? | ? | ? | ? | ? | ? | ? | ? | ? | ? | ? | ? | ? | ? | ? |
| ? | ? | 196 | 196 | 195 | 157 | 118 | 188 | 184 | 206 | 212 | 212 | 215 | ? | ? |
| ? | ? | 197 | 195 | 195 | ? | ? | ? | 181 | 202 | 208 | 206 | 211 | ? | ? |
| ? | ? | 197 | 194 | ? | ? | ? | ? | ? | 190 | 203 | 188 | 184 | ? | ? |
| ? | ? | 198 | 167 | ? | ? | ? | ? | ? | 90 | 138 | 97 | 147 | ? | ? |
| ? | ? | 194 | 181 | ? | ? | ? | ? | ? | 59 | 37 | 79 | 164 | ? | ? |
| ? | ? | 197 | 206 | ? | ? | ? | ? | ? | 75 | 48 | 94 | 216 | ? | ? |
| ? | ? | 193 | 191 | ? | ? | ? | ? | ? | 89 | 60 | 96 | 218 | ? | ? |
| ? | ? | 196 | 190 | 184 | 207 | 212 | ? | ? | 46 | 92 | 144 | 211 | ? | ? |
| ? | ? | 179 | 166 | 179 | 207 | 216 | 188 | 81 | 104 | 112 | 126 | 213 | ? | ? |
| ? | ? | 200 | 210 | 215 | 198 | 210 | 194 | 58 | 58 | 81 | 107 | 193 | ? | ? |
| ? | ? | 202 | 205 | 209 | 195 | 211 | 203 | 201 | 52 | 40 | 42 | 181 | ? | ? |
| ? | ? | ? | ? | ? | ? | ? | ? | ? | ? | ? | ? | ? | ? | ? |
| ? | ? | ? | ? | ? | ? | ? | ? | ? | ? | ? | ? | ? | ? | ? |

Fig. 9.

| | | | | | |
|---|---|---|---|---|---|
| 196 | 186 | 154 | 189 | 207 | 210 |
| 193 | 189 | 164 | 170 | 172 | 176 |
| 192 | 187 | ? | 78 | 86 | 140 |
| 193 | 193 | 206 | 83 | 87 | 165 |
| 189 | 194 | 200 | 112 | 101 | 167 |
| 202 | 204 | 201 | 134 | 73 | 137 |

Fig. 10.

| | | | | |
|---|---|---|---|---|
| 1 | 5 | 8 | 5 | 1 |
| 5 | 25 | 40 | 25 | 5 |
| 8 | 40 | 64 | 40 | 8 |
| 5 | 25 | 40 | 25 | 5 |
| 1 | 5 | 8 | 5 | 1 |

METHODS AND APPARATUS FOR GENERATING GRAPHICS PATTERNS USING PIXEL VALUES FROM A HIGH RESOLUTION PATTERN

FIELD OF THE INVENTION

The invention relates to methods and apparatus for generating data defining graphics patterns. For example, the invention can be used when an image of an object is "cut-out" and "pasted" upon a different background as for example in the preparation of catalogue pages and the like. However, the invention is also concerned with the generation of graphics patterns in general.

SUMMARY OF THE INVENTION

In accordance with one aspect of the present invention, a method of generating a graphics pattern comprising digital data defining the color content of pixels of the pattern within a pattern area at a first, high resolution comprises (a) defining the color content of "seed" pixels at selected positions within the pattern area which are to influence the resultant pattern, the remaining pixels at the first high resolution being considered as having undefined color content;

(b) generating successively lower spatial resolution versions of the pattern area in accordance with a predetermined algorithm which, when sufficient defined pixels exist in the next higher resolution version neighboring an undefined pixel, interpolates color data for the corresponding lower resolution pixel, until all pixels of a lower resolution version contain defined data; and (c) generating a version of the pattern area at the first, high resolution wherein the content of at least the previously undefined first high resolution pixels is obtained from the lower resolution versions of the pattern area.

In accordance with a second aspect of the present invention, apparatus for generating a graphics pattern comprising digital data defining the color content of pixels of the pattern within a pattern area at a first, high resolution comprises a pattern area store for storing data defining the color content of "seed" pixels at selected positions within the pattern area which are to influence the resultant pattern; means for indicating that the remaining pixels at the first high resolution are considered as having undefined color content; a pattern pyramid store; and processing means, the processing means being connected to the stores and being adapted to operate on the pattern area by generating and storing in the pyramid store successively lower spatial resolution versions of the pattern area in accordance with a predetermined algorithm which, when sufficient defined pixels exist in the next higher resolution version neighboring an undefined pixel, interpolate the color data for the corresponding lower resolution pixel, until all pixels of a lower resolution version contain defined data, and which, thereafter, generates a version of the pattern area at the first, high resolution wherein the content of at least the previously undefined first high resolution pixels is obtained from the lower resolution versions of the pattern area.

We have developed a new pattern generating technique which has a number of different applications. In the simplest application, new, artificial patterns can be generated from an array of seed pixels defined by an operator, the method automatically interpolating the content of the remaining pixels in an efficient and fast manner.

Various methods may be used to indicate that the non "seed" pixels are undefined. The simplest approach to be described in more detail below is to code these pixels with some special value but alternatively a separate mask could be generated which is referred to during the processing steps. Such a mask, however, would need to be generated at each spatial resolution.

Although the invention is applicable to the generation of monochrome patterns, it is primarily concerned with the generation of colored patterns so that at each step, each color component will be operated upon.

As well as being able to generate general synthetic patterns, the invention is particularly useful in the generation of modified images or image portions. For example, when generating a catalogue it is common to place a large number of different items or images on a common background. A straight cut-out of the object often appears unnatural, as the object appears to cast no shadow. To deal with this, artificial shadows are created using airbrush tools but this involves considerable labor and expertise by the operator. Airbrush tools are used in other applications which it would be desirable to automate.

Thus, preferably the seed pixels are selected from an existing pattern or image. In this case, the apparatus further comprises a monitor; a frame store connected to the monitor for storing digital data defining the pixels of an image or image portion to be modified; and an input device connected to the processing means whereby in use the image or image portion stored in the frame store is displayed on the monitor and the operator selects, via the input device, the seed pixels which are to be used in the process.

The invention is particularly useful for generating shadows and the like around objects within an image or image portion as well as enabling other features to be inserted into images.

For example, the tool will enable gaps in a slowly varying background such as sky where some feature has been removed to be filled, enables gaps formed by scratches to be filled, and enables smooth vignettes to be created fitting through values at target points or on a boundary.

In this application, the method preferably further comprises combining selected portions of the original image or image portion and the generated graphics pattern. This combining step will typically be carried out in a conventional manner using a mask or the like although it should be noted that this mask will not necessarily be the same as that used to distinguish between seed pixels and non-seed pixels.

As an alternative, this combination step may not be necessary if the process is carried out on the original image pixel data.

It should also be noted that some or all of the seed pixels could be defined differently from the pixels which exist in corresponding spatial positions within the image or image portion. In the simplest case, existing pixel data could be modified, for example to boost the black color component but it is also possible for completely different data to be generated for the seed pixels.

The invention is based on the idea of successively reducing the resolution of a pattern with "holes" in the data to generate a "pyramid" of versions of the image at increasingly lower resolutions until each "hole" is small enough, typically one pixel wide or high, to enable its content to be interpolated from its neighbors. If sufficient lower resolution versions are obtained, eventually one will be found in which all "holes" have been filled. The original higher resolution holes can then be filled by interpolating data from this lower resolution version.

Typically, in step (b) each lower resolution pixel corresponds to four pixels from the next higher resolution version. The pixel value is conveniently obtained by averaging the four higher resolution values since this leads to a particularly fast operating rate. Where one or more of the higher resolution pixel values is undefined, averaging is performed on just the known values.

The regions of seed pixels which are selected by the operator can comprise solid regions, thin boundaries having a width of one or two pixels, and isolated points. In addition, as already mentioned, the color component content of the seed pixels can be modified. For example, where shadows or the like are to be generated, the black color component could be boosted. Of course, other modifications leading to artificial effects could also be made.

The invention enables effects such as colored shadows to be generated as well as enabling relatively complex objects to be provided with a realistic shadow. For example, in the case of an image of an automobile, where the shadow is deepest around the tires and not under the body, the operator can add extra boundary points by defining further selected regions in the center or at the edge of the area to be provided with the shadow to influence the resulting shadow.

The various image stores could be provided as separate components or as a single large memory while the processing means will typically be a suitably programmed computer.

The predetermined algorithm applied in step (b) can be any conventional algorithm for generating lower resolution images modified to take account of undefined pixel values. For example the low resolution pixel value could be determined by a weighted average of the defined values in the 5×5 pixel region centered on the corresponding pixel in the high resolution image.

The generation of higher resolution versions in step (c) can also be conventional.

See for example, the methods described by P. J. Burt in "Multiresolution Image Processing and Analysis", Springer-Verlag 1984, pages 6–13, particularly page 13.

BRIEF DESCRIPTION OF THE DRAWINGS

An example of a method and apparatus according to the invention will now be described with reference to the accompanying drawings, in which:

FIG. 8 illustrates the pixel content of one color component of a small portion of an image at a high resolution; and FIGS 9–10 illustrates the same portion as shown in FIG. 8 but at a lower resolution.

EMBODIMENT

Figure 1:
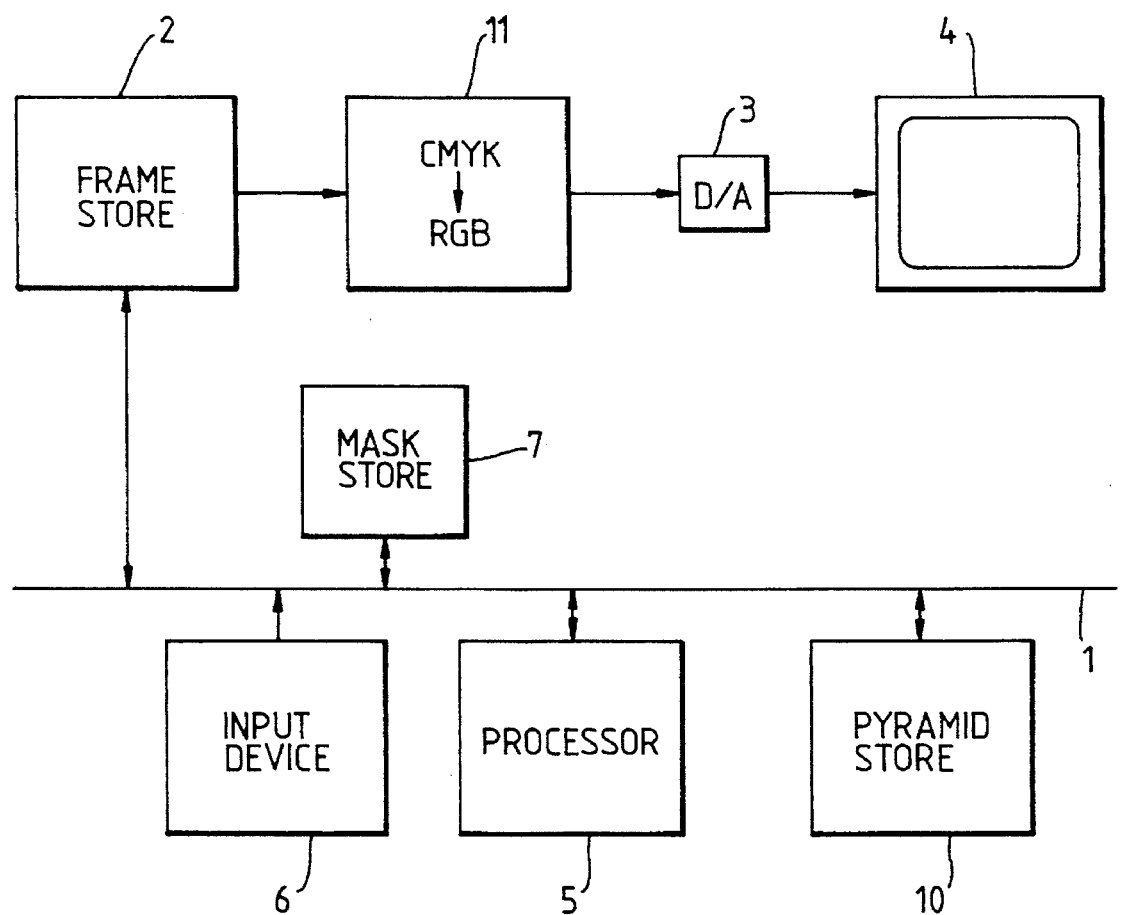
FIG. 1 is a block diagram of the apparatus.

The apparatus shown in FIG. 1 includes an address/data bus shown schematically at 1 to which is connected a frame store 2 which holds digital data defining the color component content (red, green and blue) of an original image. That image may have been generated in a number of different ways which are not relevant to the present invention. For example, it could result from combining a number of separate images together from different sources. The frame store 2 is connected via a digital-to-analogue converter 3 to a monitor 4 to enable the image in the frame store 2 to be displayed. The bus 1 is also connected to a processor 5, such as a suitably programmed computer, and an input device 6 such as a digitising table to enable an operator to control operation of the processor. In addition, the bus 1 is connected to a number of stores. These comprise a mask store 7 whose function will be described below, and a pyramid store 10 for storing representations of the original image at successively lower resolutions.

Figure 2:
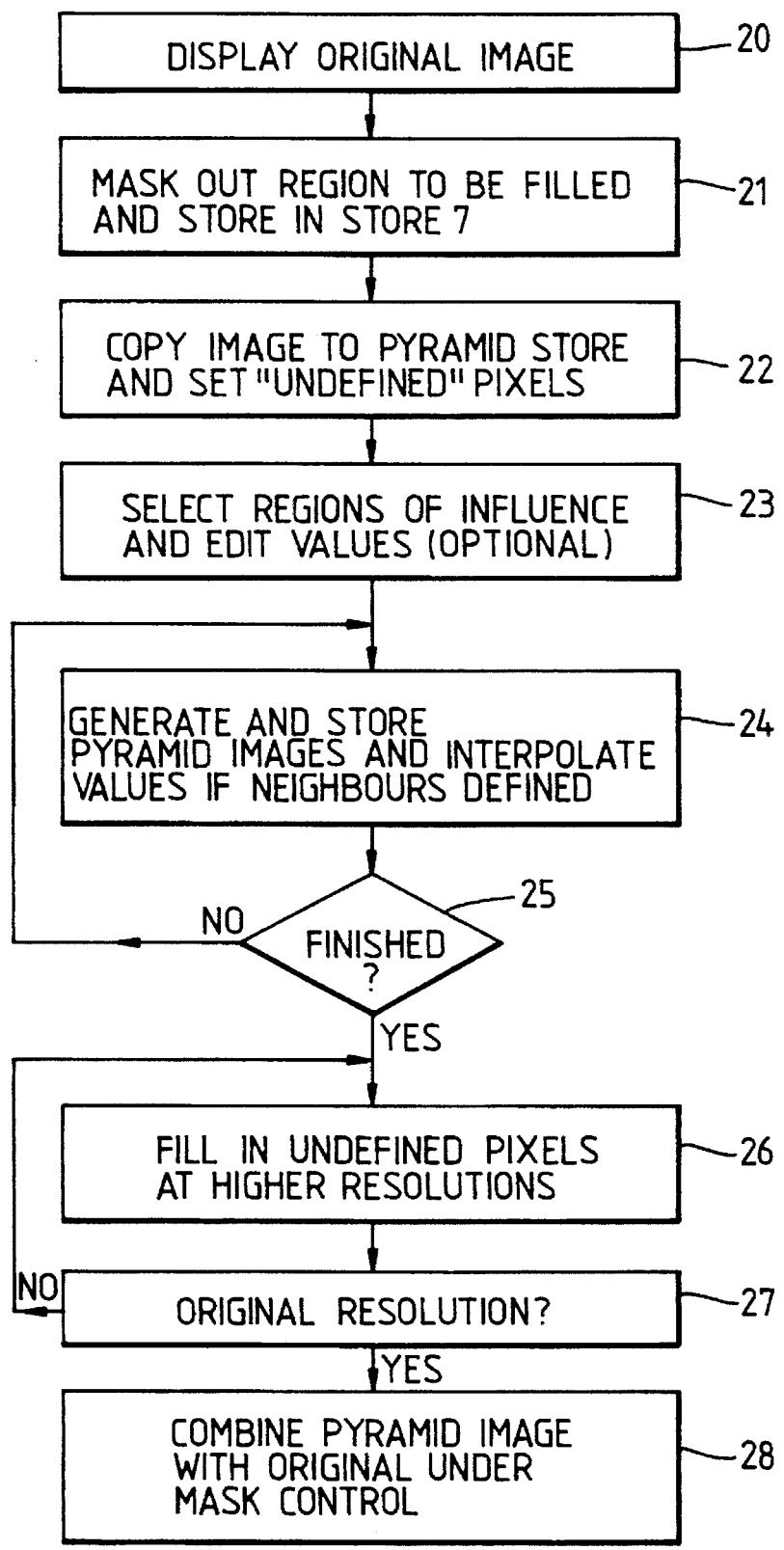
FIG. 2 is a flow diagram illustrating operation of the apparatus.
Figure 3:
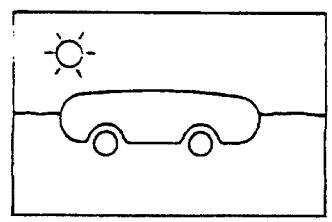
FIGS. 3–7 illustrate the processing of an image to generate a colored shadow.

The example will be described in connection with providing a colored shadow on an image of a car. The original image stored in the frame store 2 and displayed on the monitor 4 is shown in FIG. 3. Initially, therefore the operator causes the processor 5 via the input device 6 to display the image in the framestore 2 on the monitor 4 (step 20, FIG. 2).

While viewing the image on the monitor, the operator defines those areas of the image which are to be filled with the newly generated graphics pattern. In this example, the operator will define the area which is to incorporate the shadow of the car which will be defined by a line 31 (FIG. 4) together with the underside of the car and the wheels. This area is defined in the mask store 7 by a one-bit mask which, for the masked out pixels will have the value "1" while all other pixels in the mask store 7 will have the value "0". This is defined by step 21 in FIG. 2. The mask is shown by a line 35 in FIG. 6.

The image is also copied at its original high resolution into a first portion of the pyramid store 10 (step 22) and those pixels within the region defined by the mask in the store 7 are set to a value which indicates that they are "undefined".

The operator then selects regions of the displayed image which are to influence the color and shape of the shadow (step 23). For example, pixels around the boundary 31 of the shadow whose thickness (in the plane of the image) will typically be one or two pixels thick. The operator may also decide that the colors of the "seed" pixels in this boundary region need to be adjusted and for example he may decide to boost the black component by 50%.

Figure 4:
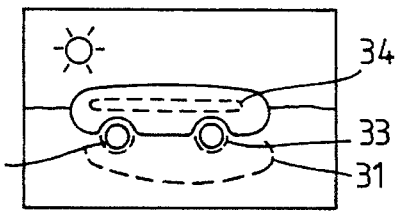

Another major influence on the shadow will be the shape of the car wheels and consequently the operator moves the cursor around parts of the wheels as shown at 32 and 33 in FIG. 4. Again, the width and if desired the color of these boundary regions will be defined.

Finally, the outer body of the car will have some influence on the shadow and the area which has the prime influence 34 is outlined by the operator and similar processing steps repeated.

Figure 5:
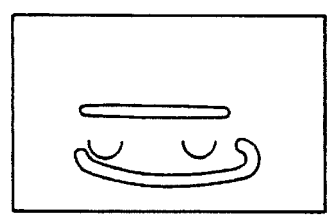

All the seed pixels in the regions 31–34 are defined at their appropriate locations in the pyramid store 10 at the highest resolution as shown in FIG. 5 while all other pixels in this high resolution version are set to an "undefined" value. It should be noted that the masked out region of the image will generally be smaller than the area of undefined pixels in the pyramid store 10.

In the next stage (step 24) the processor then generates successively lower resolution versions of the image in the pyramid store 10 until a version is found in which all pixels have a valid value. There are several ways in which a pyramid of images can be generated but we have developed a new, simple method which we have found yields acceptable results but is rapid to operate. In this example, each pixel of a low resolution version of the image is computed by taking the average of the four pixels in the next higher resolution of the image. If one or more of these higher resolution pixels is undefined then an average is taken of only the defined values. This is exemplified in FIGS. 8, 9 and 10. FIG. 8 illustrates a very small portion of a high resolution version of the image as stored in the pyramid store 10 for one color component. As can be seen, most of the pixels are filled with values but certain pixels are undefined as designated by the "?". Here we have added a 2-pixel border of "?" values to show how we might handle the special conditions at the edges of the image.

FIG. 9 shows the low resolution pixel values. A pixel value 40 is given by a weighted average of the defined values in the corresponding 5×5 pixel high resolution region 41. Using the weights from FIG. 10 we get $$
\begin{aligned}
\text{value} &= (196 \times 64 + 196 \times 40 + 195 \times 8 \\
&\quad + 197 \times 40 + 195 \times 25 + 195 \times 5 \\
&\quad + 197 \times 8 + 194 \times 5) \\
&\quad (64 + 40 + 8 + 40 + 25 + 5 + 8 + 5) \\
&= 196 \text{ rounded to the nearest integer.}
\end{aligned}
$$

Where none of the high resolution values 42 is known, the low resolution value 43 must be marked as unknown. In this case the pixel has two pairs of defined neighbors, so its value may be interpolated.

$$
\begin{aligned}
\text{value} &= (164 + 187 + 78 + 206)/4 \\
&= 134 \text{ rounded to the nearest integer.}
\end{aligned}
$$

Once a lower resolution version of the shadow image has been generated and stored in the pyramid store 10, the processor 5, in one example, reviews the pixels defining that image to see whether all the pixels are valid. (Step 25) If there are still undefined pixels, processing returns to step 24 and the next lower resolution version is generated. If, however, all the pixels are valid a final, high resolution shadow image is generated (steps 26 and 27).

Alternatively, sufficient lower resolution versions are obtained to be certain that there could not be any undefined pixels left.

The final shadow image is generated in the following manner (steps 26, 27). For each pixel in the final shadow image which corresponds to a valid, defined pixel in the original high resolution version of the shadow image in the pyramid store 10, the same value is stored. Thus, if FIG. 8 represents the original high resolution version of the shadow image, then in the final version of the shadow image, the pixel corresponding to pixel 44 will store the value 181 for that color component. Where the original high resolution pixel is undefined (for example pixels in the region 42) then a value is obtained by performing an interpolation based on the nearest lower resolution pixels. Typically, the interpolation will be as described in the reference defined above.

Figure 6:
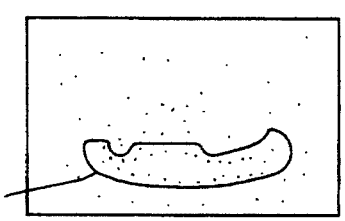

The result of this process is a final, high resolution shadow image as shown schematically in FIG. 6. As can be seen, pixel values are present throughout the shadow image although there is a concentration in a particular gradation of pixels within the area defined by the original masking process.

Figure 7:
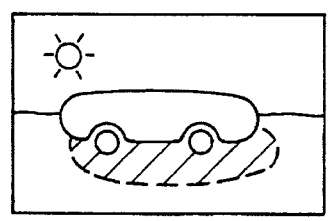

The processor then combines the high resolution shadow image in the pyramid store 10 with the image in the frame store 2 under the control of the mask in the store 7 in a conventional manner to produce a final image (step 28). This final image is shown in FIG. 7. The combination could be a permanent adjustment to the values in the frame store 2 or a temporary combination without storage using a method such as described in EP-A-0344976. In any event, the final combined image is eventually stored in the framestore 2.

The combination of the two images if controlled by a binary mask will involve the simple replacement of those pixels in the original image which underlie the shadow image within the mask 35 by the shadow pixels. If a soft mask is used then a more complex linear interpolation algorithm based upon the masked values would be used.

I claim:

1. A method of generating a graphics pattern comprising digital data defining the color content of pixels of the pattern within a pattern area at a first, high resolution, the method comprising
    (a) defining the color content of first pixels at selected positions within said pattern area which are to influence a resultant pattern, all pixels in said pattern area at said first high resolution other than said first pixels being considered as having undefined color content;
    (b) generating successively lower spatial resolution versions of said pattern area in accordance with a predetermined algorithm which, when a predetermined number of defined pixels exist in a next higher resolution version neighboring an undefined pixel, interpolates color data for the corresponding lower resolution pixel, until all pixels of a lower resolution version contain defined data; and
    (c) generating a version of said pattern area at said first, high resolution wherein the content of at least the previously undefined first high resolution pixels is obtained from said lower resolution versions of said pattern area.

2. A method according to claim 1, wherein said first pixels are selected from an existing pattern or image.

3. A method according to claim 1, further comprising combining selected portions of an original image or image portion and said generated graphics pattern.

4. A method according to claim 1, wherein the method generates a shadow around an object within an image or image portion.

5. A method according to claim 1, wherein in step (b) each lower resolution pixel corresponds to four pixels from said next higher resolution version.

6. A method according to claim 5, wherein a pixel value is conveniently obtained by averaging said four higher resolution values.

7. Apparatus for generating a graphics pattern comprising digital data defining the color content of pixels of said pattern within a pattern area at a first, high resolution, said apparatus comprising a pattern area store for storing data defining the color content of first pixels at selected positions within said pattern area which are to influence a resultant pattern; means for indicating that all pixels in said pattern area at said first high resolution other than said first pixels are considered as having undefined color content; a pattern pyramid store; and processing means, said processing means being connected to said pattern area store and said pyramid store and being adapted to operate on said pattern area by generating and storing in pyramid store successively lower spatial resolution versions of the pattern area in accordance with a predetermined algorithm which, when a predetermined number of defined pixels exist in a next higher resolution version neighboring an undefined pixel, interpolates the color data for a corresponding lower resolution pixel, until all pixels of a lower resolution version contain defined data, and which, thereafter, generates a version of said pattern area at said first, high resolution wherein the content of at least said previously undefined first high resolution pixels is obtained from said lower resolution versions of said pattern area.

8. Apparatus according to claim 7, further comprising a monitor, a frame store connected to said monitor for storing digital data defining pixels of an image or image portion to be modified; and an input device connected to said processing means whereby in use said image or image potion stored in said frame store is displayed on the monitor and an operator selects, via said input device, said first pixels which are to be used in the process.

* * * * *